United States Patent [19]

Yoshino

[11] Patent Number: 4,800,439

[45] Date of Patent: Jan. 24, 1989

[54] DATA COMMUNICATION APPARATUS ADAPTED TO PERFORM DATA COMMUNICATION AND SPEECH COMMUNICATION

[75] Inventor: Motoaki Yoshino, Tokyo, Japan

[73] Assignee: Canon Kabushiki Kaisha, Tokyo, Japan

[21] Appl. No.: 14,387

[22] Filed: Feb. 13, 1987

[30] Foreign Application Priority Data

Feb. 26, 1986 [JP] Japan ................................ 61-042460

[51] Int. Cl.$^4$ ............................................. H04N 1/32
[52] U.S. Cl. .................................... 358/257; 379/100
[58] Field of Search .................. 358/257, 85; 379/100

[56] References Cited

U.S. PATENT DOCUMENTS 4,485,400 11/1984 Lemelson ............................... 358/85
4,567,322 1/1986 Tsuda .................................... 379/100
4,654,718 3/1987 Sueyoshi .............................. 379/100

Primary Examiner—Howard W. Britton
Attorney, Agent, or Firm—Fitzpatrick, Cella, Harper & Scinto

[57] ABSTRACT

A data communication apparatus includes a device for performing data communication in a data communication mode, a device for performing speech communication in a speech communication mode, a detector for detecting a signal from a calling station indicating that the calling station is in a data communication mode, and a controller for switching, during speech communication in the speech communication mode, the data communication apparatus from the speech communication mode to the data communication mode in response to the detecting of the signal by the detector.

15 Claims, 2 Drawing Sheets

DATA COMMUNICATION APPARATUS ADAPTED TO PERFORM DATA COMMUNICATION AND SPEECH COMMUNICATION

BACKGROUND OF THE INVENTION

1. Field of the Invention

The present invention relates to a data communication apparatus which automatically receives data.

2. Related Background Art

Apparatus for communicating signals through a telephone line, speech communication apparatus for transmitting and receiving speed signals and data communication apparatus which transmits and receives data such as image signals are known.

When data is to be automatically received in a speech communication apparatus, an automatic telephone receiver is used, and when it is to be automatically received by the data communication apparatus, a facsimile machine is used. The automatic telephone receiver and the facsimile machine are separate units. Accordingly, when one of the units is used, only one of the speech signal and the image signal can be received.

When the automatic telephone receiver and the facsimile machine are combined into one unit, it is necessary to switch the apparatus from receiving a speech signal to receiving an image signal by a switch. Because an operator must manipulate the switch, such an apparatus is cumbersome.

SUMMARY OF THE INVENTION

It is an object of the present invention to provide an improved data communication apparatus.

It is another object of the present invention to resolve the problems described above.

It is another object of the present invention to provide a data communication apparatus which automatically switches between speech recording and data recording.

It is still another object of the present invention to provide a data communication apparatus which selectively records speech and data in accordance with a signal from a transmitting station.

It is another object of the present invention to provide a data communication device which can automatically receive the speech signal or the image signal whichever signal is transmitted.

DESCRIPTION OF THE PREFERRED EMBODIMENT

Figure 1:
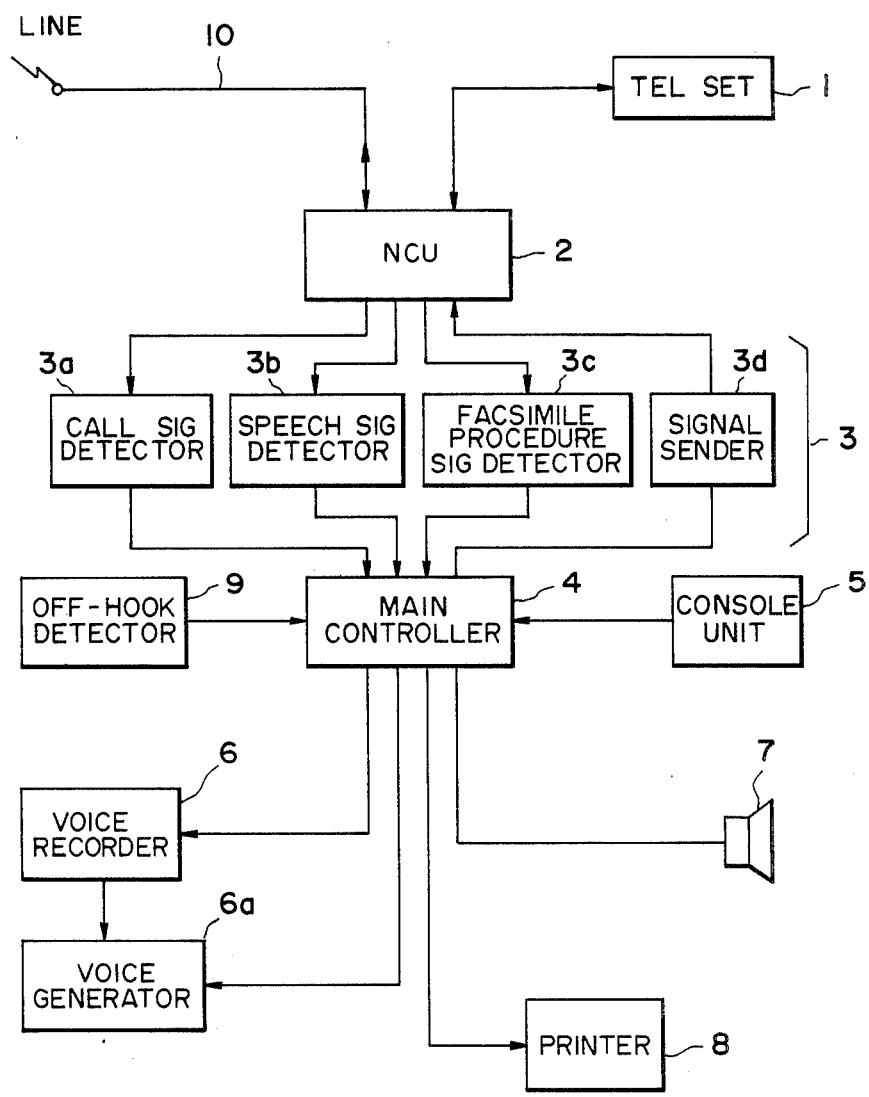
FIG. 1 is a block diagram of one embodiment of the present invention.

FIG. 1 shows a block diagram of a facsimile machine in accordance with the present invention.

In FIG. 1, a network control unit (NCU) 2 switches a line 10 to a telephone set 1 or a facsimile machine. A communication control unit 3 is means for detecting signals supplied from the line 10 and comprises a call signal detector 3a for detecting a call, a speech signal detector 3b corresponding to speech recognition means for detecting speech of a sending speaker, a facsimile protocol signal a main control unit Y of the detector 3c for informing detection of a facsimile protocol signal, and a signal transmitter 3d. The main control unit 4 drives a printer unit 8 which is image recording means or speech recording means 6, depending on a type of signal sent from the sending station. If the signal sent is a speech signal, the main control unit 4 drives a speech recording unit 6, and if it is the image signal, the main control unit 4 drives the printer unit 8. The main control unit 4 comprises a microcomputer and its peripheral equipments such as ROM and RAM.

A console unit 5 comprises key switches and a display member such as an LCD. The speech recording unit 6 records the speech signal sent from the sending station, and a speech reproducing unit 6a reproduces the recorded speech signal. The speech data is compacted by a PCM system and stored in a memory of the speech recording unit 6. An off-hook detector 9 informs the off-hook of a handset of the telephone set 1 and an operator's response to the main control unit 4.

Figure 2:
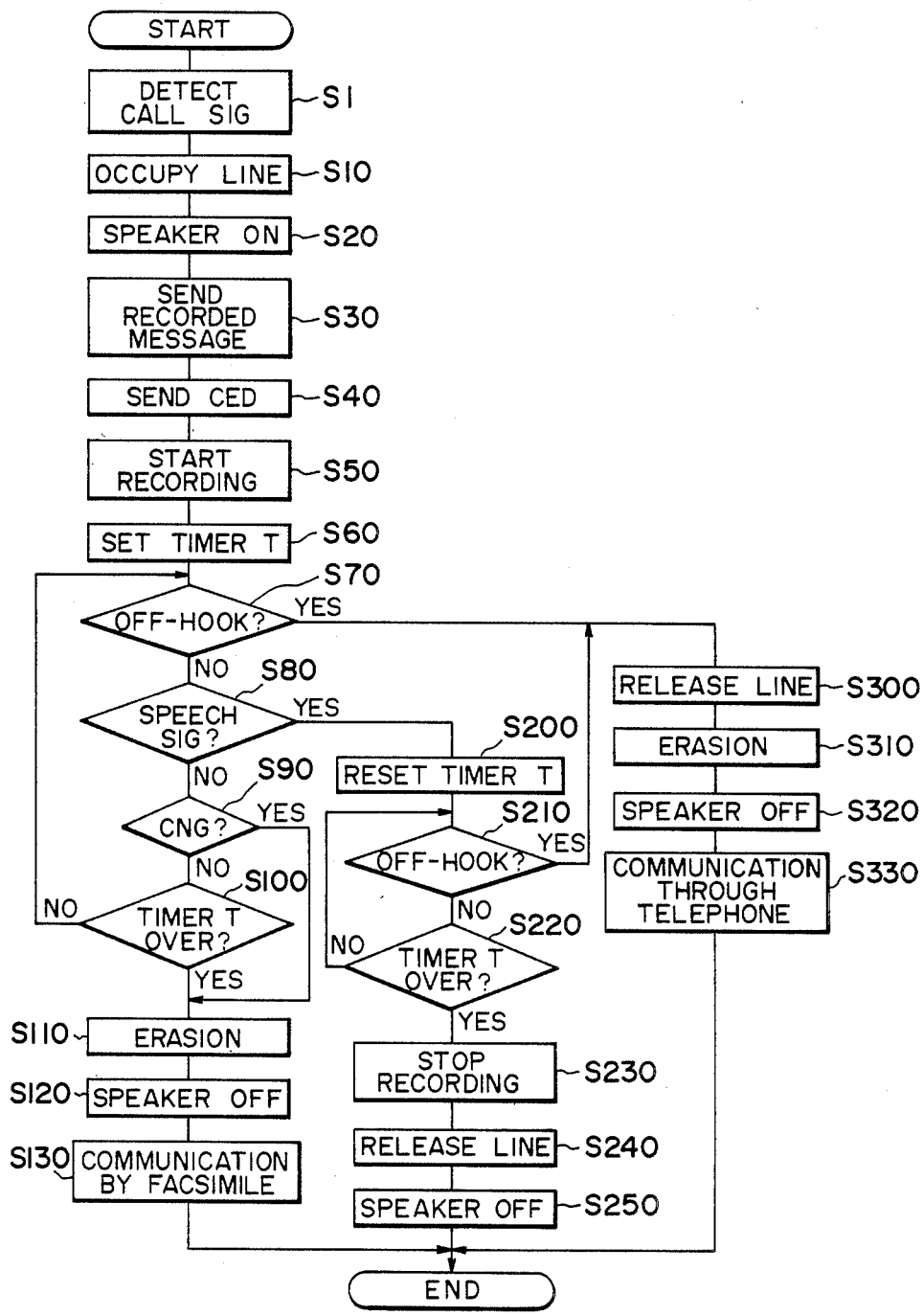
FIG. 2 shows a flow chart of a control operation of a main control unit 4 of the embodiment.

The operation of the present embodiment is explained. FIG. 2 shows a flow chart of the operation of the embodiment, and shows an automatic reception operation after the detection of a call signal. A program to execute the flow chart of FIG. 2 is stored in the ROM of the main control unit 4.

When the call signal detector 3a detects the call signal (S1), the main control unit 4 drives the network control unit 2 and occupies the line (S10). It drives a speaker 7 to monitor the line (S20) to inform the call to persons nearby. It sends a response message previously recorded in the speech recorder 6 (S30) to inform to the sending speaker that the signal is received without the attendance of an operator. It sends a called equipment identification (CED) signal to the calling station (S40) to inform the response to the calling station (sending facsimile machine).

It starts recording in preparation for a speech signal sent through the line 10 (S50) and sets a predetermined time (timer interval T)(S60). When the detector 9 detects the on-hook state (S70) and the speech signal is detected by the speech detector 3b (S80), an automatic telephone receive mode in steps S200 et seq is started.

The main control unit 4 resets the timer interval T (S200), checks the on-hook status by the detector 9 (S210), continues the recording during the timer interval T (S220), stops the recording when the timer interval T times out (S230), opens the line (S240) and deenergizes the speaker 7 (S250).

If the off-hook status is detected in S210 (that is, if someone places the handset off the hook), the main control unit opens the line (S300), erases the record (S310), deenergizes the speaker 7 (S320) and allows the operator to speak by the telephone set 1 (S330). Namely, when the off-hook state is detected (S210), it means that someone has taken the handset off the hook and responded, and speech communication using the telephone set is carried out.

If the on-hook state is detected (S70) after the timer interval T has been set (S60) and the speech signal is not received (S80) and a calling tone CNG of the calling station is detected (S90), it is determined that the operation mode is a facsimile mode. In this case, the record is erased (S110), the speaker is deenergized (S120) and facsimile communication is carried out (S130).

The record is erased (S110) in order to allow effective utilization of the speech recorder 6 in other than the automatic telephone receive mode. If necessary, memory is erased and a magnetic tape is used, and rewinding and erasing are carried out.

When a RAM is used as a recording medium of the speech recorder 6 and a failure such as lack of paper takes place in the printer 8 when the communication is made in the facsimile mode, the RAM area is used as the image memory to receive the signal.

If the timer interval T is timed out (S100) without detecting the speech signal and CNG in the on-hook state, the facsimile mode is executed (S110-S130).

In S80, the speech signal detector 3b recognizes the speech. If the speech recognition means is not provided, the signal component may be detected, and if the signal is not CNG, it is judged that the signal is the speech signal and the automatic telephone receive mode (S200-S250) may be executed.

In accordance with the embodiment of the present embodiment, in the automatic receive apparatus having the automatic telephone receive function and the image communication function, the received signal can be recorded, whichever it is, i.e., the speech signal or the image signal.

While the facsimile machine is used in the present embodiment, the present invention is applicable to not only a facsimile machine but also to a data communication apparatus having a speech record function, such as a mixed mode terminal which handles both character code data and image data.

The present invention is not limited to the illustrated embodiment but various modifications thereof may be made.

I claim:

1. A data communicating apparatus comprising:
   means for performing data communication in a data communication mode;
   means for performing speech communication in a speech communicating mode;
   detection means for detecting a signal from a calling station indicating that the calling station is in a data communication mode; and
   control means for switching, during speech communication in the speech communication mode by said speech communication means, said data communicating apparatus from the speech communication mode to the data communication mode in response to the detecting of said detection means.

2. A data communicating apparatus according to claim 1, wherein said control means switches said data communicating apparatus from the speech communication mode to the data communication mode in response to the detection of the signal.

3. A data communicating apparatus according to claim 1, further comprising means for detecting a speech signal from the calling station, wherein said control means switches said data communicating apparatus to the speech communication mode upon the detection of the speech signal.

4. A data communicating apparatus according to claim 1, wherein said speech communication means includes memory means for storing a speech message and means for sending the speech message stored in said memory means to the calling station.

5. A data communicating apparatus according to claim 1, wherein said speech communication means includes a recording medium, wherein said speech communication means records a speech message sent from the calling station in said recording medium.

6. A data communication apparatus according to claim 5, wherein said recording medium comprises a memory.

7. A data communication apparatus according to claim 5, further comprising means for erasing the speech message recorded in said recording medium when said data communicating apparatus is in the speech communication mode upon switching said data communicating apparatus from the speech communication mode to the data communication mode.

8. A data communicating apparatus comprising:
   means for receiving a communication request from a calling station;
   means for performing data communication;
   means for performing speech communication;
   detection means for detecting a signal from the calling station indicating that the calling station is in a data communication mode; and
   control means for enabling said speech communication means and said data communication means, selectively, in response to the communication request and for switching between the performing of speech communication by said speech communication means and the performing of data communication by said data communication means in response to the detecting by said detection means.

9. A data communicating apparatus according to claim 8, wherein said control means enables said speech communication means in response to the communication request and switches from the performing of speech communication by said speech communication to the performing of data communication by said data communication means in response to the detection of the signal by said detection means.

10. A data communication apparatus according to claim 8, wherein said speech communication means includes a recording medium and wherein said speech communication means records a speech message sent from the calling station in said recording medium.

11. A data communicating apparatus according to claim 8, wherein said speech communication means includes memory means for storing a speech message and means for sending the speech message stored in said memory means to the calling station.

12. A facsimile apparatus comprising:
   means for receiving a communication request from a calling station;
   means for performing image data communication;
   means for performing speech communication;
   detection means for detecting a signal from the calling station representing a calling tone;
   control means for enabling said speech communication means in response to the communication request and for switching from the performing of speech communication by said speech communication means to the performing of image data communication by said image data communication means in response to the detection of the signal.

13. A facsimile apparatus according to claim 12, wherein said speech communication means includes memory means for storing a speech message and means for sending the speech message stored in said memory means to the calling station.

14. A facsimile apparatus according to claim 12, wherein said speech communication means includes a recording medium and wherein said speech communication means records a speech message sent from the calling station in said recording medium.

15. A facsimile apparatus according to claim 17, wherein said recording medium comprises a memory.

* * * * *

UNITED STATES PATENT AND TRADEMARK OFFICE
CERTIFICATE OF CORRECTION

PATENT NO. : 4,800,439
DATED : January 24, 1989
INVENTOR(S) : Montoaki Yoshino

It is certified that error appears in the above-identified patent and that said Letters Patent is hereby corrected as shown below:

COLUMN 1:

Line 14,   "speed signals" should read --speech signals--.

Line 67,   "protocol signal a main control unit Y of the detector 3c" should read --protocol signal detector 3c for informing a main control unit Y of the --.

Line 68,   "for informing" should be deleted.

COLUMN 4:

Line 66,   "Claim 17," should read --Claim 14,--.

Signed and Sealed this

Twenty-sixth Day of December, 1989

Attest:

JEFFREY M. SAMUELS

Attesting Officer      Acting Commissioner of Patents and Trademarks